C. WESTEN.
VALVE.
APPLICATION FILED DEC. 9, 1914.

1,149,236.

Patented Aug. 10, 1915.

Witnesses:

Inventor:
Charles Westen
By Peirce, Fisher & Clapp Attys.

UNITED STATES PATENT OFFICE.

CHARLES WESTEN, OF CHICAGO, ILLINOIS.

VALVE.

1,149,236.  Specification of Letters Patent.  Patented Aug. 10, 1915.

Application filed December 9, 1914. Serial No. 876,322.

*To all whom it may concern:*

Be it known that I, CHARLES WESTEN, a citizen of the United States, and a resident of Chicago, county of Cook, and State of Illinois, have invented certain new and useful Improvements in Valves, of which the following is a full, clear, and exact description.

The invention relates to valves for controlling the flow of water and the like, and more particularly to valves of the quick-opening type such as are used for water faucets. Quick-opening faucet valves are usually provided with multiple screw threads of sharp pitch so that the valve can be quickly opened and closed by turning its stem through a partial rotation.

The present invention seeks to provide improved means for holding the coöperating threads of the valve and valve casing in snug engagement and with sufficient friction to prevent the pressure of the supply from accidentally opening the valve.

The invention consists of the features of improvement hereinafter set forth, illustrated in the preferred form in the accompanying drawings and more particularly pointed out in the appended claims.

Figure 1:
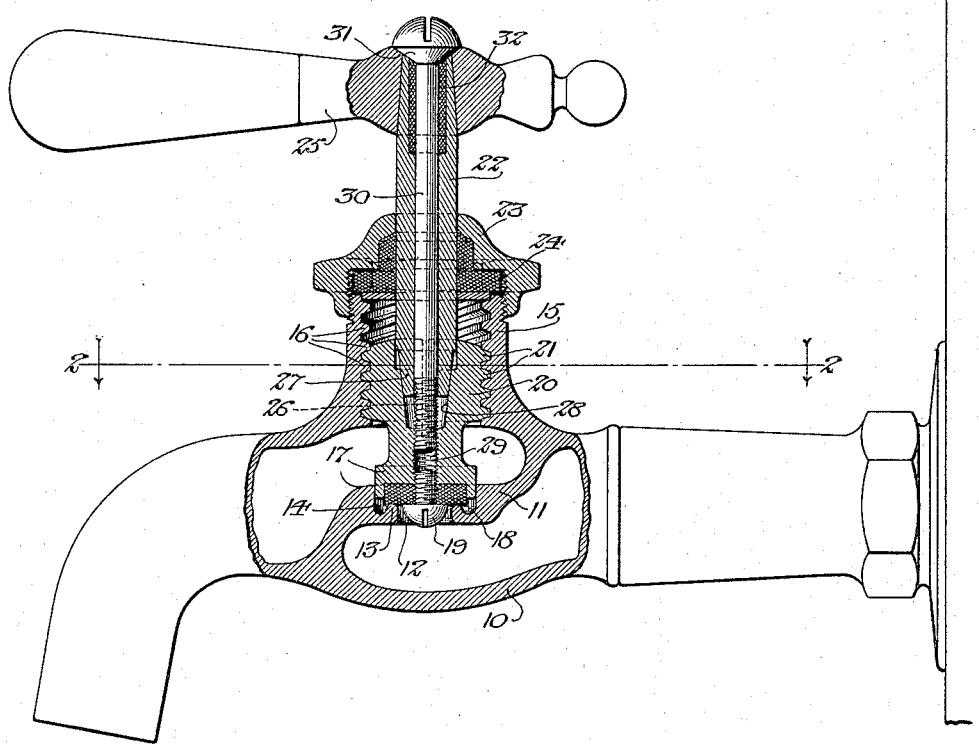
Figure 2:
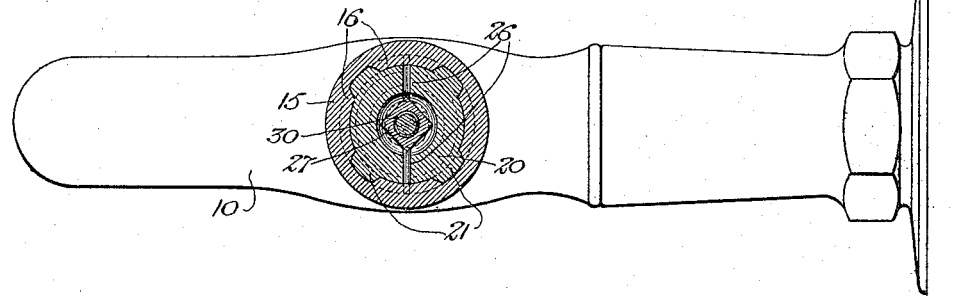

In the drawings, Figure 1 is a vertical section of the improved valve. Fig. 2 is a plan section taken on the line 2—2 of Fig. 1.

The valve casing 10, in the form shown, is adapted for use in a faucet and is provided with the usual partition 11 having a port 12 extending therethrough. The port is provided on its upper or discharge side with a valve seat 13 and the partition, as shown, is preferably provided with an annular recess 14 extending about the seat. Above the seat the valve casing is provided with an upwardly projecting cylindrical portion 15 provided with internal screw threads 16.

The valve 17 comprises a metal body portion and a washer 18 of packing material which is held within a recess in its lower face by a screw 19 and which, in the closed position of the valve, engages the valve seat 13. The valve 17 is provided with an enlarged upper portion 20 which is provided with external screw threads 21 that coöperate with the screw threads 16 of the valve casing to open and close the valve. Preferably, the threads 16 and 21 are multiple and of sharp pitch so that the valve is quickly opened and closed by turning it through a partial revolution.

The valve stem 22 extends through a cap 23 which is threaded upon the upper end of the cylindrical portion 15 of the valve casing. As usual, suitable packing material 24 is held in place by the cap 23 to prevent leaking about the valve stem. At its upper end the valve stem is provided with the usual handle 25 which fits snugly thereon.

To hold the screw threads 21 of the valve snugly in engagement with the screw threads 16 of the valve casing, the screw threaded part 20 of the valve is split and divided into sections by a vertical saw cut 26 and the lower end of the valve stem is provided with a tapered portion 27 which is square or angular in section and which fits into a correspondingly shaped bore or socket 28 that is formed in the screw threaded portion 20 of the valve. The bore of the valve is provided with a reduced, internally threaded lower portion 29 and the valve stem 22 is provided with a bore which extends from end to end therethrough. A screw bolt 30 extends through the bore of the valve stem and has a threaded lower end that engages the threaded portion 29 of the bore of the valve. The head of the screw bolt 30 engages the upper end of the valve stem so that by means of the bolt the lower tapered end of the stem can be forced into the tapered bore or seat 28 of the valve, to thereby expand the screw threaded portion of the valve and force the threads 21 into snug engagement with the threads 16 of the valve casing. By this means, sufficient friction is developed between the screw threads to prevent the accidental opening of the valve by the pressure of the supply. It should be noted that the tapered lower end of the valve stem extends only part way into the tapered bore or seat 28 of the valve, so that any wear upon the screw threads can be taken up by tightening the screw bolt 30 and forcing the tapered lower end portion 27 further into the socket 28. It should also be noted that the construction is such that a secure connection is provided between the valve and the valve stem.

The head of the screw bolt 30 overlaps the upper end of the stem 22 and also preferably overlaps the hub portion of the handle 25 so that it also serves to secure the handle against displacement. Preferably, as shown, the head of the screw bolt is provided with a conical or valve-like under surface 31 and the abutting surfaces of the valve stem and the hub of the handle 25 are correspondingly shaped to constitute a seat for the head of the bolt. In this way, a tight joint is provided so that there will be no leaking about the upper end of the screw bolt 30. If desired, the upper portion of the bore of the valve stem may be enlarged so that packing material 32 may be placed therein to assist in forming a tight joint about the upper end of the screw bolt.

It is obvious that changes may be made in the details set forth without departure from the essentials of the invention as defined in the claims.

I claim as my invention:—

1. The combination with a valve casing having a threaded part, of a rotary valve having a split threaded part coöperating with the threaded part of said valve casing to open and close the valve, the split threaded part of said valve having a tapered bore, an expanding member adjustably fitting within said tapered bore and a screw bolt extending through and adjustably connecting said expanding member and said valve, said screw bolt being arranged to force said expanding member into the tapered bore of said valve, to thereby maintain the threaded parts of said valve and valve casing in snug engagement and take up wear between the same, substantially as described.

2. The combination with a valve casing having a threaded portion, of a valve having a split threaded part coöperating with the threaded portion of said valve casing to open and close the valve, and a valve stem projecting from said casing and having an expanding inner portion extending between the sections of said split threaded part to maintain the same in snug engagement with the threaded portion of said valve casing.

3. The combination with a valve casing having a seat and a threaded portion, of a valve on the discharge side of said seat having a split threaded part coöperating with the threaded portion of said casing to open and close the valve, a valve stem having an expanding portion, and a screw bolt extending axially through said valve and valve stem for forcing said expanding portion between the sections of said split threaded part.

4. The combination with a valve casing having a seat and a threaded portion, of a valve on the discharge side of said seat having a split threaded part coöperating with the threaded portion of said casing to open and close the valve, a hollow valve stem having an expanding portion, and a screw bolt extending through the bore of said stem and threaded into said valve for adjustably connecting said valve and stem and for forcing said expanding portion between the sections of said split threaded part, said screw bolt having a headed outer end overlapping the outer end of said stem and adapted to form a tight joint therewith.

5. The combination of a valve casing having a seat, a valve on the discharge side of said seat, said valve and casing having screw threaded parts coöperating to open and close the valve, the threaded part of said valve being split and provided with an angular tapered bore, a valve stem having an expanding inner end fitting the tapered bore of said split threaded part, and means for adjustably connecting said valve and stem.

6. The combination of a valve casing having a seat, a valve on the discharge side of said seat, said valve and casing having screw threaded parts coöperating to open and close the valve, the threaded part of said valve being split and provided with an angular tapered bore, a valve stem having a tapered, angular inner end extending within said bore, a screw bolt extending axially through said stem and adjustably threaded at its inner end into said valve, said bolt having a headed outer end overlapping the outer end of said stem, and means for maintaining a tight joint about said bolt.

CHARLES WESTEN.

Witnesses:
J. G. ANDERSON,
A. R. CROSMAN.